United States Patent
Kimata

(10) Patent No.: US 8,735,011 B2
(45) Date of Patent: May 27, 2014

(54) FUEL CELL SYSTEM

(75) Inventor: Mitsuru Kimata, Kiyosu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1493 days.

(21) Appl. No.: 11/920,859

(22) PCT Filed: May 26, 2006

(86) PCT No.: PCT/JP2006/311037
§ 371 (c)(1),
(2), (4) Date: Nov. 21, 2007

(87) PCT Pub. No.: WO2006/126740
PCT Pub. Date: Nov. 30, 2006

(65) Prior Publication Data
US 2010/0003563 A1    Jan. 7, 2010

(30) Foreign Application Priority Data

May 26, 2005   (JP) ................. 2005-154025

(51) Int. Cl.
*H01M 8/04* (2006.01)
(52) U.S. Cl.
USPC .......................................... 429/433; 429/434
(58) Field of Classification Search
USPC ....................................................... 429/429
See application file for complete search history.

(56) References Cited

U.S. PATENT DOCUMENTS

| 6,383,672 | B1 | 5/2002 | Fujita |
| 7,179,555 | B2 | 2/2007 | Kudou et al. |
| 7,179,556 | B2 | 2/2007 | Saito et al. |
| 7,368,196 | B2 | 5/2008 | Wexel et al. |
| 2001/0032674 | A1* | 10/2001 | Brunet et al. ............... 137/487.5 |
| 2004/0209135 | A1* | 10/2004 | Wexel et al. ..................... 429/26 |
| 2005/0019631 | A1* | 1/2005 | Miyauchi et al. ............... 429/24 |
| 2005/0130005 | A1 | 6/2005 | Saito et al. |

FOREIGN PATENT DOCUMENTS

| DE | 100 18 139 A1 | 12/2000 |
| DE | 102 35 464 A1 | 2/2003 |
| DE | 10 2004 016 375 A1 | 10/2004 |
| JP | 01-169269 A | 7/1989 |
| JP | 06-304087 A | 11/1994 |
| JP | 2000-315512 A | 11/2000 |
| JP | 2001-155753 A | 6/2001 |

(Continued)

OTHER PUBLICATIONS

Office Action received Oct. 28, 2010 in the corresponding German Patent Application No. 11 2006 001 348.3 with English translation thereof.

*Primary Examiner* — Ula C Ruddock
*Assistant Examiner* — Jacob Marks
(74) *Attorney, Agent, or Firm* — Kenyon & Kenyon LLP

(57) ABSTRACT

A fuel cell system is provided including heating means for heating up heat medium that exchanges heat with a fuel cell, and in which the fuel cell is warmed up by the heat medium heated by the heating means. The system includes: flow rate detecting means for detecting a flow rate of the heat medium flowing through the heating means; and heat controlling means for controlling the heating means based on the flow rate of the heat medium detected by the flow rate detecting means. With this arrangement, it is possible to prevent overheating of the heat medium in the fuel cell system in which the heat medium is heated to warm up the fuel cell.

19 Claims, 2 Drawing Sheets

(56) References Cited

FOREIGN PATENT DOCUMENTS

| | | | |
|---|---|---|---|
| JP | 2002-246054 A | 8/2002 |
| JP | 2003-249251 A | 9/2003 |
| JP | 2004-235075 A | 8/2004 |
| JP | 2004-303446 A | 10/2004 |

* cited by examiner

FUEL CELL SYSTEM

This is a 371 national phase application of PCT/JP2006/311037 filed 26 May 2006, claiming priority to Japanese Patent Application No. 2005-154025 filed 26 May 2005, the contents of which are incorporated herein by reference.

TECHNICAL FIELD OF THE INVENTION

The present invention relates to a fuel cell system that produces electric energy through electrochemical reaction.

BACKGROUND ART

A fuel cell system obtains electric energy by electrochemically reacting a combustion gas such as hydrogen with an oxygen-containing oxidation gas via an electrolyte. Since such a fuel cell system has a defined operating temperature that allows for electric power generation, it is sometimes arranged such that, if the temperature of the fuel cell has not reached the operating temperature, e.g. at the time of start-up, the fuel cell is heated up (warmed up) quickly to reach the temperature that allows for electric power generation. Furthermore, since generating efficiency of the fuel cell system is decreased when the operating temperature is too high, it is arranged such that, if the temperature of the fuel cell is too high, heat exchange means such as a radiator is used to exchange heat with outside air to cool down heat medium, and then the cooled heat medium is used to cool down the fuel cell.

One type of conventional fuel cell systems is a fuel cell system in which a fuel cell is warmed up by using heat medium that has been heated through a heater of fuel combustion-type and an exhaust gas obtained from such a heater (see Japanese Patent Application Laid-Open Publication No. 2001-155753, for example). With this type of fuel cell system, the fuel cell can be warmed up quickly by using the heated heat medium and the exhaust gas even at the time the combustion-type heater is just after start-up and the temperature of the heat medium is still low.

Another type of conventional fuel cell systems is a fuel cell system in which heat medium is heated by using heat of a hydrogen combustor for burning hydrogen exhausted from a fuel cell and the heated heat medium is used to warm up the fuel cell, where intermediate heat exchanging means is disposed downstream from a heat exchanger between the hydrogen combustor and the heat medium, in which the heat medium is caused to circulate, so that the heat of the hydrogen combustor is released via the intermediate heat exchanging means (see Japanese Patent Application Laid-Open Publication No. 2004-235075, for example). With this type of fuel cell system, the heat of the hydrogen combustor can be released via the intermediate heat exchanging means, and heating of the heat medium in thermal contact with the hydrogen combustor can be reduced. Therefore, it is possible to prevent excess temperature rise in the heat medium for cooling down the fuel cell.

In addition to the above-mentioned documents, Japanese Patent Application Laid-Open Publication No. 6-304087, Japanese Patent Application Laid-Open Publication No. 1-169269, and Japanese Patent Application Laid-Open Publication No. 2003-249251 also disclose techniques related to fuel cell systems.

SUMMARY OF THE INVENTION

In conventional fuel cell systems, a temperature of a fuel cell is input into an electronic control unit (ECU) and the ECU regulates the above-mentioned heater, circulating path of the heat medium, and the like according to a program that is preset based on the fuel cell temperature. Therefore, when the ECU is operating normally, the heater is stopped or the heat medium is circulated in a way that cools down the heat medium in response to excess heating of the heat medium, so that overheating of the heat medium can be prevented. However, when the ECU is not operating normally, the heater is not stopped in a suitable way or the heat medium is not circulated in a way that cools down the heat medium, so that the cooling water may possibly be overheated. In particular, if the heat medium is not flowing within the heater, the heat medium acting as the target to be heated may remain in the heater without circulating, so that the heat medium may possibly be heated drastically into a boil.

Furthermore, in conventional fuel cell systems, a temperature sensor is provided to detect a temperature of the heat medium heated through the heater, and the heater is stopped based on the detected temperature of the heat medium. However, since there is a certain time lag before the heated heat medium reaches the temperature sensor, the heater may possibly be delayed in stopping, which may further cause overheating of the heat medium.

In view of the various-problems discussed above, a technical purpose of the present invention is to provide a fuel cell system in which heat medium is heated to warm up a fuel cell and in which overheating of the heat medium can be prevented.

The present invention provides a fuel cell system including: a fuel cell that obtains electric energy through electrochemical reaction; temperature detecting means for detecting a temperature of the fuel cell; a heat medium circulating path in which heat medium for exchanging heat with the fuel cell is circulated; a heat medium pump for circulating the heat medium in the heat medium circulating path; heat exchanging means for cooling down the heat medium, the heat exchanging means being disposed on the heat medium circulating path; a heat exchanging means bypass in which the heat medium is circulated to bypass the heat exchanging means on the heat medium circulating path; heat medium flow rate controlling means for controlling a flow rate of at least one of the heat medium flowing through the heat exchanging means bypass and the heat medium flowing through the heat medium circulating path based on the temperature of the fuel cell detected by the temperature detecting means; heating means for heating the heat medium, the heating means being disposed on the heat exchanging means bypass; flow rate detecting means for detecting a flow rate of the heat medium flowing through the heat exchanging means bypass; and heat controlling means for controlling the heating means based on the flow rate of the heat medium detected by the flow rate detecting means.

The fuel cell system according to the present invention controls a flow rate of at least one of the heat medium flowing through the heat medium circulating path and the heat medium flowing through the heat exchanging means bypass, based on the temperature of the fuel cell detected by the temperature detecting means. The heat medium flowing through the heat medium circulating path is cooled down by the heat exchanging means and the heat medium flowing through the heat exchanging means bypass is heated up by the heating means, respectively. The fuel cell system according to the present invention uses the cooled or heated heat medium to cool down or heat up the fuel cell.

In case where the fuel cell has not yet reached such a temperature that allows for electric power generation and thus requires to be warmed up, examples of the control of the flow rate of the heat medium may include: flowing the heat medium only through the heat exchanging means bypass on which the heating means is disposed, that is, allowing the heat medium to flow only through the heating means but not through the heat exchanging means; allowing a larger flow rate of the heat medium to flow through the heating means; and allowing a smaller flow rate of the heat medium to flow through the heat exchanging means. Accordingly, by controlling the flow rate of the heat medium in this way, it is possible to warm up the fuel cell by using the heat medium that has been heated.

On the other hand, in case where the fuel cell is at a high temperature, examples of the flow rate of the heat medium may include: allowing the heat medium to flow only through the heat exchanging means but not through the heating means; allowing a larger flow rate of the heat medium to flow through the heat exchanging means; and allowing a smaller flow rate of the heat medium to flow through the heating means. Accordingly, by controlling the flow rate of the heat medium in this way, it is possible to lower the temperature of the fuel cell by using the heat medium that has been cooled.

A fuel cell system according to the present invention may include: the flow rate detecting means for detecting a flow rate of the heat medium flowing through the heating means; and the heat controlling means for controlling the heating means based on the detected flow rate, so that the heating means may be controlled based on the flow rate of the heat medium flowing through the heating means. Accordingly, the heating means may be operated only when the heat medium of an appropriate flow rate is flowing through the heating means, or the heating means may be controlled in such a way that prevents overheating of the heat medium based on the flow rate of the heat medium flowing through the heating means. Accordingly, by detecting the flow rate of the heat medium flowing through the heating means and controlling the heating means based on the detected flow rate, it is possible to prevent overheating of the heat medium and keep it not reaching a boil, thereby avoiding failure of the fuel cell system.

Preferably, the heat controlling means may control start and stop of the heating means based on the flow rate of the heat medium detected by the flow rate detecting means. In this case, the heat controlling means controls the heating means in such a way that prevents overheating of the heat medium based on the flow rate of the heat medium detected by the flow rate detecting means. The heating means may be controlled by various arrangements including an arrangement that starts or stops the heating means based on the detected flow rate of the heat medium, an arrangement that increases or decreases a heat quantity of the heating means based on the detected flow rate, and the like.

However, the heat controlling means according to the present invention only needs to keep the temperature of the heat medium not higher than the temperature that brings the heat medium to a boil, but is not necessarily required to provide any minute temperature control. Accordingly, it is preferable that the heat controlling means have an arrangement as simple as possible, and the arrangement that starts or stops the heating means based on the flow rate of the heat medium is more suitable. With this arrangement, it is possible to simplify the controlling by the heat controlling means, thereby realizing prevention of malfunction as well as reduction of cost.

Furthermore, in the fuel cell system according to the present invention, it is preferable that the flow rate detecting means detect a flow rate of the heat medium flowing through the heat exchanging means bypass according to a difference in pressure between the heat medium flowing into the heating means and the heat medium flowing out of the heating means.

Since the heating means acts as a resistance when there is heat medium flowing through the heating means, the heat medium before flowing into the heating means and the heat medium after flowing out of the heating means may have different pressures from each other in the heat exchanging means bypass. On the other hand, in case where the heating means has no heat medium flowing therein or has only a small rate of the heat medium flowing therein, the heat medium before flowing into the heating means and the heat medium after flowing out of the heating means may have no difference or have only a small amount of difference in pressure in the heat exchanging means bypass.

It is thus possible to detect a flow rate of the heat medium flowing through the heating means by detecting a difference in pressure between the heat medium before flowing into the heating means and the heat medium after flowing out of the heating means. In addition, the above-mentioned arrangement for detection of difference in pressure is simple in comparison with those arrangements that use a flow meter or the like for detection of flow rate.

BEST MODE FOR EMBODYING THE INVENTION

Modes for embodying a fuel cell system according to the present invention will now be described in detail with reference to the drawings.

Embodiment 1

Figure 1:
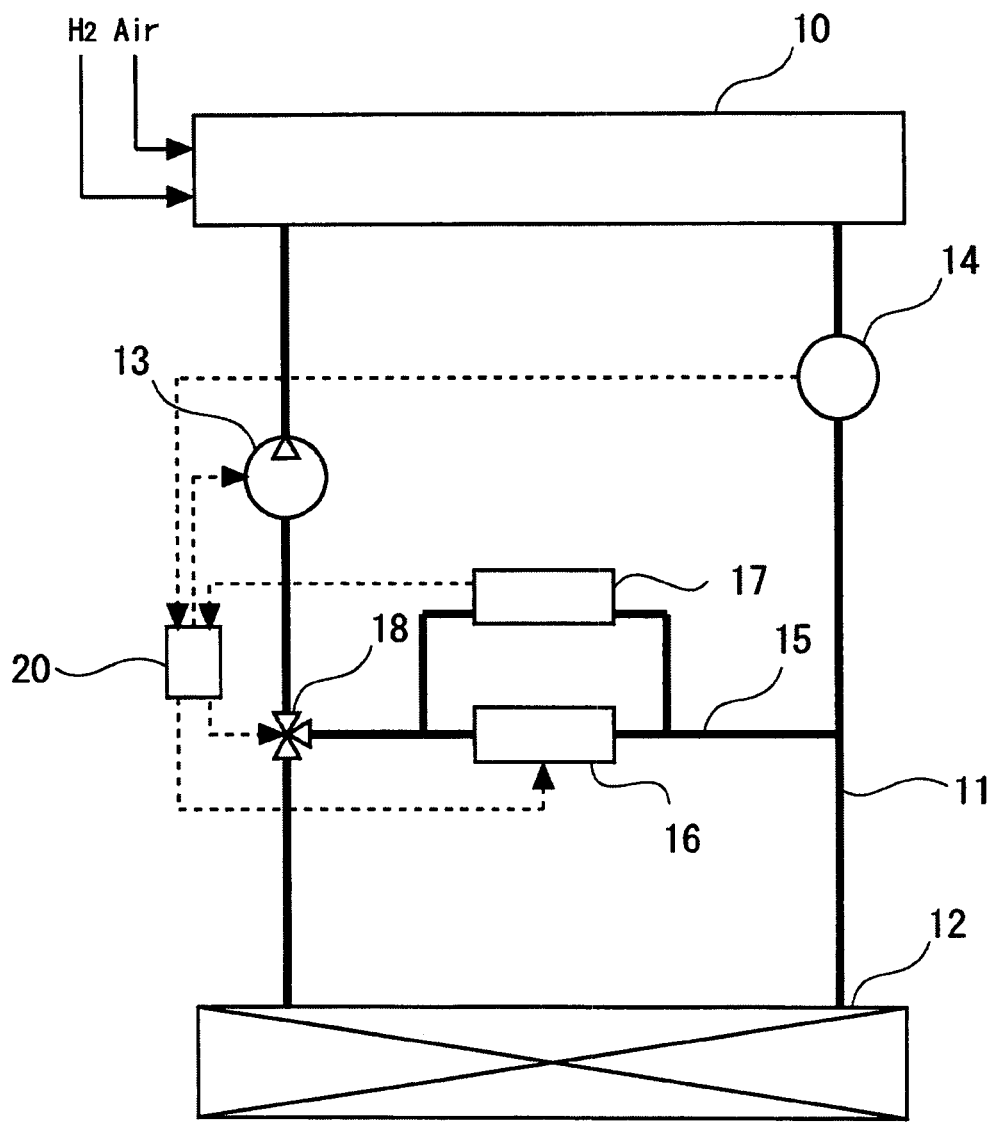
FIG. 1 is a block diagram of a fuel cell system according to an embodiment of the present invention.

FIG. 1 is a block diagram of a fuel cell system to which the present invention is applied. The fuel cell system includes: a fuel cell 10; a hydrogen supply unit (not shown) supplying hydrogen as fuel; an air supply unit (not shown); a heating-and-cooling system; and an electronic control unit (ECU) 20.

The fuel cell 10 obtains electric energy through electrochemical reaction between hydrogen and oxygen via electrolyte. The fuel cell 10 according to the present embodiment is a polymer electrolyte membrane fuel cell, i.e. a type of fuel cell commonly used for electrical vehicles that run on fuel cells as power supplies.

The fuel cell 10 is configured such that hydrogen is supplied from the hydrogen supply unit and oxygen-containing air is supplied from the air supply unit. For example, a reformer unit or hydrogen storage tank can be used as the hydrogen supply unit, and an air compressor being an adiabatic compressor can be used as the air supply unit.

During a process of electric power generation in the fuel cell 10, water and heat are generated from chemical reaction for electric power generation and thus result in rise of temperature in the fuel cell 10. However, in view of generating efficiency, it is preferable that the temperature of the fuel cell 10 be kept not higher than a certain level during electric power generation. The fuel cell 10 thus includes a cooling system that uses heat medium to release the heat generated in the fuel cell 10.

The cooling system includes: a cooling water circulating path 11 for circulating cooling water acting as the heat medium through the fuel cell 10; a radiator 12 acting as heat exchanging means for cooling down the cooling water; a cooling water pump 13 acting as a heat medium pump for adjusting a flow rate of the cooling water to be circulated; and a temperature sensor 14 acting as temperature detecting means for detecting a temperature of the cooling water that has passed through the fuel cell 10. The cooling water that has been heated through the fuel cell 10 goes through the cooling water circulating path 11 and then the radiator 12 in which heat is exchanged between the cooling water and outside air, thereby cooling down the cooling water. The cooled down cooling water goes through the fuel cell 10 again, exchanges heat with the fuel cell 10, and then flows out of the fuel cell 10 after being heated.

The fuel cell system also includes a heating system integral with the cooling system. The heating system is a system for heating up (warming up) the fuel cell 10 when it has not yet reached a temperature that allows for electric power generation, such as at the time of startup under a low temperature.

The heating system includes: a radiator bypass 15 in communication with the cooling water circulating path 11 and acting as heat exchanging means bypass for allowing the cooling water to bypass the radiator 12; a heater 16 disposed on the radiator bypass 15 and acting as heating means for heating the cooling water; and a differential pressure sensor 17 acting as flow rate detecting means for detecting a flow rate of the cooling water going through the heater 16. Since the only requirement for the heater 16 is being capable of heating the cooling water acting as the heat medium, an electric heater or a combustion-type heater may be used.

The differential pressure sensor 17 detects a difference in pressure between the cooling water flowing into the heater 16 and the cooling water flowing out of the heater 16 in the radiator bypass 15. Since the heater 16 acts as a resistance when there is cooling water passing through the heater 16, there may be a difference in pressure produced between the cooling water before flowing into the heater 16 and the cooling water after flowing out of the heater 16. The differential pressure sensor 17 detects the difference in pressure and thereby detects a flow rate of the cooling water passing through the heater 16 (hereinafter referred to as through-heater flow rate Fh). Here, in order to detect the through-heater flow rate Fh, other methods may be used as well instead of the differential pressure sensor 17, such as a flow sensor that detects a flow rate of the cooling water directly, or any indirect detection method based on a variation in physical quantity other than pressure, e.g. temperature, of the cooling water.

At the time of warming up the fuel cell 10, e.g. at the time of starting up the fuel cell system under a low temperature, the cooling water is circulated in the radiator bypass 15. The cooling water is heated by the heater 16 disposed on the radiator bypass 15, and then is passed through the fuel cell 10 to warm up the fuel cell 10. A three-way valve 18 is disposed at the junction of the cooling water circulating path 11 and the radiator bypass 15, and allows the cooling water to be circulated in either the cooling water circulating path 11 or in the radiator bypass 15.

The electric control unit (ECU) 20 is configured to have inputs of a temperature of the fuel cell 10 detected by the temperature sensor 14 (hereinafter referred to as fuel cell temperature Tfc) and the through-heater flow rate Fh. The ECU 20 controls the heater 16, the three-way valve 18, and the cooling water pump 13 according to a program that is preset based on the fuel cell temperature Tfc and the through-heater flow rate Fh, and functions as heat medium flow rate controlling means and heat controlling means according to the present invention.

Figure 2:
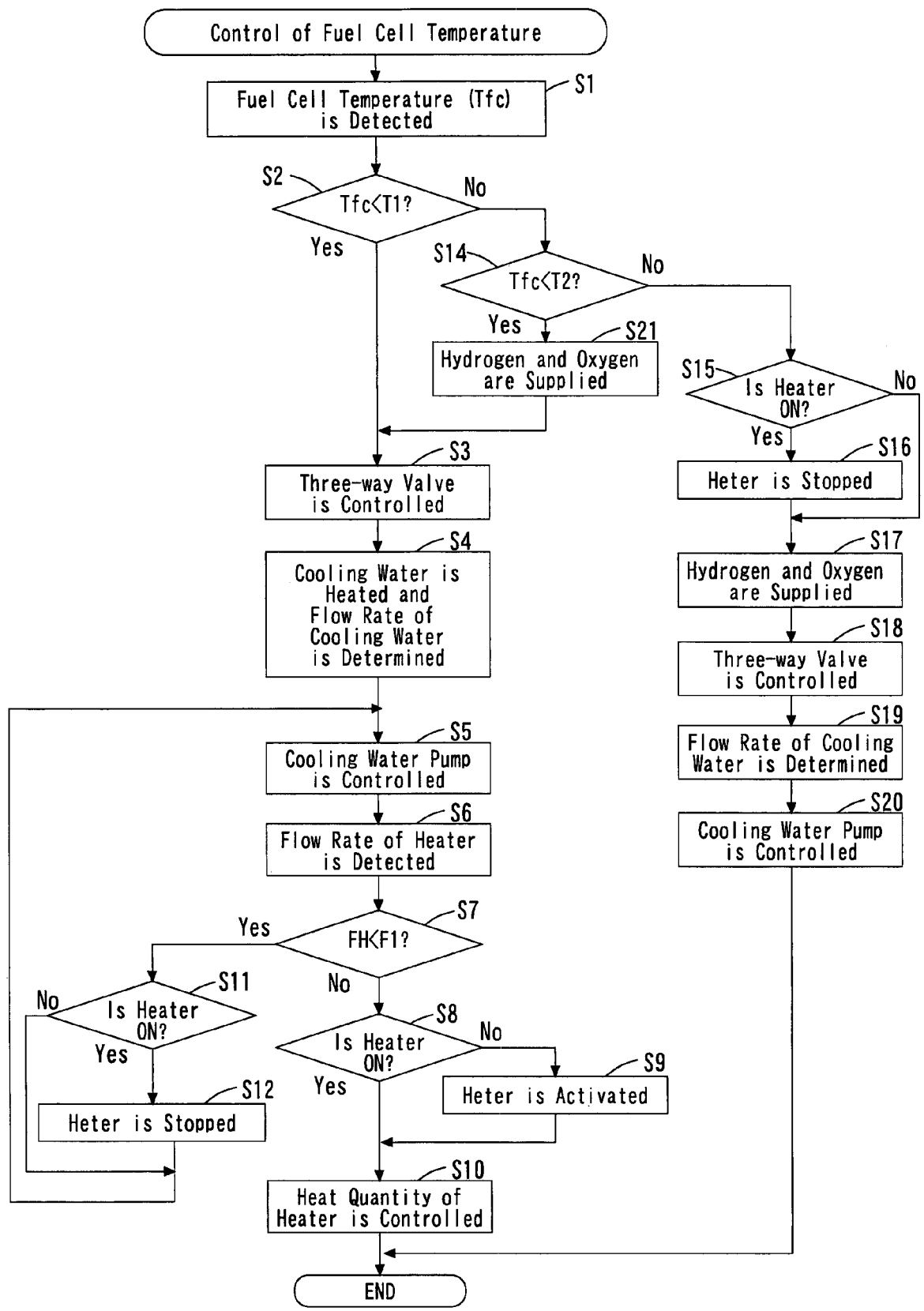
FIG. 2 is a flowchart showing a process in the fuel cell system according to the embodiment of the present invention.

The following describes control of fuel cell temperature in the fuel cell system of the above-mentioned configuration with reference to the flowchart shown in FIG. 2. The control of fuel cell temperature shown by the flow chart of FIG. 2 is executed by the ECU 20. The control of fuel cell temperature is a routine that is repeated at regular intervals.

First of all, the fuel cell temperature Tfc is calculated (step 1), and then is determined whether or not being lower than a predetermined temperature T1 (step 2). The fuel cell temperature Tfc is calculated based on a temperature of the cooling water just flowed out of the fuel cell 10 detected by the temperature sensor 14. The predetermined temperature T1 is obtained by adding a predetermined allowance on a minimum temperature that allows for electric power generation in the fuel cell 10. The fuel cell 10 does not carry out electric power generation if its temperature is not higher than the predetermined temperature T1. By making the determination of step 2, it is possible to determine whether or not the fuel cell 10 is in a state capable of electric power generation.

If the fuel cell temperature Tfc is determined to be lower than the predetermined temperature T1 as a result of the determination made in step 2, then the fuel cell 10 is in a state not capable of electric power generation. A warm-up process is thus performed to warm up the fuel cell 10 into a state capable of electric power generation.

In a warm-up process, the three-way valve 18 is used to control the circulating path of the cooling water (step 3). Specifically, the three-way valve 18 is controlled such that the cooling water flows through the radiator bypass 15 on which the heater 16 is disposed rather than the cooling water circulating path 11 on which the radiator 12 is disposed. By flowing the cooling water through the radiator bypass 15, it is possible to heat the cooling water through the heater 16 disposed on the radiator bypass 15 and then use the heated cooling water to warm up the fuel cell 10.

A heat quantity of the heater 16 and a flow rate of the cooling water to be circulated are determined based on the fuel cell temperature Tfc (step 4). The heat quantity of the heater 16 is calculated based on the fuel cell temperature Tfc and a heat quantity for the cooling water which depends on the fuel cell temperature Tfc. Specifically, when the fuel cell temperature Tfc is low, a large quantity of heat is required to heat the fuel cell 10, so that the heat quantity of the heater 16 as well as the flow rate of the cooling water are increased.

Based on the flow rate of the cooling water determined in step 4, the cooling water pump 13 is controlled (step 5) to adjust the flow rate of the cooling water. This allows a predetermined flow rate of the cooling water to be circulated in the fuel cell 10. After the flow rate of the cooling water is adjusted, the through-heater flow rate Fh is detected (step 6). The through-heater flow rate Fh is detected by the differential pressure sensor 17 that detects a difference in pressure between the cooling water on the flowing-in side and the cooling water on the flowing-out side of the heater 16. When there is cooling water passing through the heater 16, the heater 16 acts as a resistance and produces a difference in pressure between the cooling water before flowing in and the cooling water after flowing out. The more the flow rate of the cooling water, the more the difference in pressure. The through-heater flow rate Fh is thus calculated based on the difference in pressure detected by the differential pressure sensor 17.

After the through-heater flow rate Fh is calculated, it is determined whether or not the through-heater flow rate Fh is equal to or greater than a predetermined flow rate F1 (step 7). The predetermined flow rate F1 is a value that is determined based on the heat quantity of the heater 16 calculated in step 4, and is a flow rate that does not lead to overheating of the cooling water, that is, does not bring the cooling water into a boil when the heater 16 is activated. This is because if the heater 16 is activated with only a small flow rate of the cooling water flowing through the heater 16, the temperature of the cooling water may be increased drastically and may bring the cooling water into a local boil. Additionally, if the heater 16 is activated with no cooling water flowing through the radiator bypass 15 due to failure of the ECU 20, failure in control of the three-way valve 18, and the like, the cooling water may be brought into a boil and may result in failure of the fuel cell system. Accordingly, the only requirement for the predetermined flow rate F1 is to be a flow rate that does not bring the cooling water into a boil when the cooling water is heated by the heater 16, and thus is preferably determined based on heat capacity of the heater 16, through-resistance of the heater 16, and the like.

If the through-heater flow rate Fh is determined to be equal to or greater than the predetermined flow rate F1 as a result of the determination made in step 7, the flow rate of the cooling water passing through the heater 16 is deemed sufficient. A heat process is thus carried out by the heater 16.

A determination is made as to whether or not the heater 16 is in an active state (step 8). If the heater 16 is determined to be in an active state, the heat process controls the heat quantity of the heater 16 based on the heat quantity of the heater 16 determined in step 4 (step 10). On the other hand, if the heater 16 is determined to be not in an active state, the heat process activates the heater 16 (step 9), and then controls the heat quantity of the heater 16 (step 10).

If the through-heater flow rate Fh is determined to be less than the predetermined flow rate F1 as a result of the determination made in step 7, the flow rate of the cooling water passing through the heater 16 is deemed not sufficient. No heat process is thus carried out by the heater 16. This is purposed to prevent the heater 16 from overheating the cooling water. If no heat process is to be carried out by the heater 16, it is determined whether or not the heater 16 is in an active state (step 11), and if the heater 16 is determined to be in an active state, the heater 16 is stopped (step 12). After the heater 16 is stopped or if the heater 16 is determined to be in a stopped state, the cooling water pump 13 is controlled again to cause the flow rate of the cooling water to approach the flow rate determined in step 4 (step 5) to adjust the flow rate of the cooling water, and then the through-heater flow rate Fh is detected again (step 6). Processes thereafter are same as those described above.

If the fuel cell temperature Tfc is determined to be equal to or higher than the predetermined temperature T1 in step 2, then the fuel cell temperature Tfc is determined whether or not being lower than a predetermined temperature T2 (step 14). The predetermined temperature T2 is a temperature at or below which the fuel cell 10 is preferably maintained in view of generating efficiency of the fuel cell 10, and is set as required according to, for example, the type of fuel cell.

If the fuel cell temperature Tfc is determined to be equal to or higher than the predetermined temperature T2, then a cooling process for the fuel cell 10 is carried out by using the cooling water, in order to prevent the generating efficiency of the fuel cell 10 from being decreased. First, the cooling process determines whether or not the heater 16 is in an active state (step 15). If the heater 16 is determined to be in an active state as a result of the determination, then the cooling process stops the heater 16 (step 16). This is because although the heater 16 may sometime be operating due to the warm-up process described above, no warm-up process is required anymore since the fuel cell temperature Tfc is equal to or higher than the predetermined temperature T2.

After the heater 16 is stopped, or if the heater 16 is determined to be not in an active state as a result of the determination made in step 15, then the supply of hydrogen and oxygen is started (step 17). With the supply of hydrogen and oxygen, a process of electric power generation is carried out by the fuel cell 10.

Next, the three-way valve 18 is controlled to adjust the circulating path for the cooling water (step 18). Specifically, the three-way valve 18 is controlled such that the cooling water flows through the cooling water circulating path 11 on which the radiator 12 is disposed rather than the radiator bypass 15 on which the heater 16 is disposed. Circulating the cooling water in the cooling water circulating path 11 allows the cooling water to flow through the radiator 12. Heat is exchanged by the radiator 12 between the cooling water and outside air, and the cooling water that has passed through the radiator 12 goes through the fuel cell 10 after being cooled, so that the fuel cell 10 can be cooled down.

After the three-way valve 18 is controlled, then a flow rate of the cooling water to be circulated is determined based on the fuel cell temperature Tfc (step 19). The flow rate of the cooling water is calculated based on the fuel cell temperature Tfc of the fuel cell 10 targeted for cooling. Specifically, when the fuel cell temperature Tfc is high, a large quantity of heat is required to cool down the fuel cell 10, so that the flow rate of the cooling water is increased. The cooling water pump 13 is controlled based on the flow rate of the cooling water thus determined (step 20) so as to adjust the flow rate of the cooling water.

The following describes a process to be carried out when the fuel cell temperature Tfc is determined to be lower than the predetermined temperature T2 is step 14. If the fuel cell temperature Tfc is determined to be lower than the predetermined temperature T2, the fuel cell 10 is equal to or higher than the predetermined temperature T1 that allows for electric power generation and is also lower than the predetermined temperature T2 that is the lower limit at or above which the generating efficiency starts decreasing. Therefore, the fuel cell 10 is at a temperature suitable for electric power generation.

The supply of hydrogen and oxygen is started (step 21), and the process of electric power generation is performed. Thereafter, similar processes as those in the warm-up process are executed such as controlling the circulating path for the cooling water (step 3), while keeping the fuel cell temperature Tfc at the suitable temperature.

As described above, according to the fuel cell system of the present embodiment, it is possible to carry out the warm-up process for heating up the fuel cell 10 and the cool-down process for cooling down the fuel cell 10 based on the fuel cell temperature Tfc. The warm-up process is carried out by heating the cooling water with the heater 16 and flowing the heated cooling water through the fuel cell 10. Since the heater 16 is controlled based on the through-heater flow rate Fh, it is possible to prevent the heater 16 from overheating the cooling water, thereby avoiding boiling of the cooling water as well as failure and the like of the fuel cell system accompanying the same.

Embodiment 2

In the embodiment 1 described above, the flow of the cooling water as the heat medium is controlled by the three-way valve 18 based on the fuel cell temperature Tfc that is calculated based on the temperature of the cooling water just flowed out of the fuel cell 10 and detected by the temperature sensor 14. In other words, if it is determined according to the fuel cell temperature Tfc that the fuel cell 10 require the warm-up process, the three-way valve 18 is controlled in response to an instruction from the ECU 20 such that the cooling water flows through the radiator bypass 15. If it is determined according to the fuel cell temperature Tfc that the fuel cell 10 require the cool-down process, the three-way valve 18 is controlled in response to an instruction from the ECU 20 such that the cooling water flows through the radiator 12.

Even if the three-way valve 18 is not controlled in a pro-active manner based on the fuel cell temperature Tfc, the control of fuel cell temperature shown in FIG. 2, in particular the control of the heater 16 based on the flow rate of the cooling water flowing into the heater 16 (through-heater flow rate Fh), is still useful. For example, instead of the three-way valve 18, a temperature-sensitive rotary valve may be used to switch the route of the cooling water in an active response to the temperature of the cooling water flowing through the cooling water circulating path 11. With this arrangement, the flow of the cooling water can be switched without any instructions from the ECU 20.

Even in such a case, the processes carried out by the heater 16 based on the through-heater flow rate Fh (in particular, the processes of S6 through S10) in the control of fuel cell temperature mentioned-above are still applicable. It is thus possible to prevent the heater 16 from overheating the cooling water, thereby avoiding boiling of the cooling water as well as failure and the like of the fuel cell system associated therewith.

The processes carried out by the heater 16 based on the through-heater flow rate Fh are still useful even in fuel cell systems with no control valve for controlling the flow rate of the cooling water flowing into the heater 16 and the radiator 12, such as the three-way valve 18, the temperature-sensitive rotary valve, and the like. In such fuel cell systems, the above-described warm-up and cool-down processes for the fuel cell can be executed by controlling the cooling capacity of the radiator 12 (e.g. rotation speed of a cooling fan) and the heating capacity of the heater 16 (e.g. if being an electric heater, power to be provided thereto). Even in such cases, there may still be a possibility that the flow rate of the cooling water flowing into the heater 16 be reduced. This is because the flow rate of the cooling water is adjusted by the cooling water pump 13. Therefore, the processes based on the through-heater flow rate Fh are carried out by the heater 16, thereby preventing the heater 16 from overheating the cooling water.

INDUSTRIAL APPLICABILITY

In a fuel cell system in which heat medium is heated to warm up a fuel cell, it is possible to detect a flow rate of the heat medium flowing through heating means for heating the heat medium and to control the heating means based on the detected flow rate, thereby preventing overheating of the heat medium.

The invention claimed is:
1. A fuel cell system comprising:
   a fuel cell that obtains electric power through electro-chemical reaction;
   a temperature detecting device that detects a temperature of the fuel cell;
   a heat medium circulating path in which heat medium for exchanging heat with the fuel cell is circulated;
   a heat medium pump for circulating the heat medium in the heat medium circulating path;
   a heat exchanging device that cools down the heat medium, the heat exchanging device being disposed on the heat medium circulating path;
   a heat exchanging device bypass in which the heat medium is circulated to bypass the heat exchanging device on the heat medium circulating path, wherein the heat exchanging device bypass is separate from, but in fluid communication with, the heat medium circulating path, the heat exchanging device bypass creating a flow path for the heat medium that does not include the heat exchanging device;
   a heat medium flow rate controlling device, which is programmed to control a flow rate of at least one of the heat medium flowing through the heat exchanging device bypass and the heat medium flowing through the heat medium circulating path, based on the temperature of the fuel cell detected by the temperature detecting device;
   a heating device that heats the heat medium, the heating device being disposed on the heat exchanging device bypass;
   a flow rate detecting device that detects a flow rate of the heat medium flowing through the heat exchanging device bypass, the flow rate detecting device being disposed on the heat exchanging device bypass; and
   a heat controlling device, which is programmed to control the heating device based on the flow rate of the heat medium detected by the flow rate detecting device.

2. The fuel cell system in accordance with claim 1, wherein the heat medium flow rate controlling performs controlling such that:
   if the temperature of the fuel cell detected by the temperature detecting device is lower than a first predetermined temperature, the flow rate of the heat medium flowing through the heat exchanging device bypass is made larger than the flow rate of the heat medium flowing through the heat medium circulating path on which the heat exchanging device is disposed, and
   if the temperature of the fuel cell detected by the temperature detecting device is equal to or higher than a second predetermined temperature, the flow rate of the heat medium flowing through the heat medium circulating path on which the heat exchanging device is disposed is made larger than the flow rate of the heat medium flowing through the heat exchanging device bypass.

3. A fuel cell system comprising:
   a fuel cell that obtains electric power through electro-chemical reaction;
   a heat medium circulating path in which heat medium for exchanging heat with the fuel cell is circulated;
   a heat medium pump for circulating the heat medium in the heat medium circulating path;
   a heat exchanging device that cools down the heat medium, the heat exchanging device being disposed on the heat medium circulating path;
   a heat exchanging device bypass in which the heat medium is circulated to bypass the heat exchanging device on the heat medium circulating path, wherein the heat exchanging device bypass is separate from, but in fluid communication with, the heat medium circulating path, the heat exchanging device bypass creating a flow path for the heat medium that does not include the heat exchanging device;

a heating device that heats the heat medium, the heating device being disposed on the heat exchanging device bypass;

a flow rate detecting device that detects a flow rate of the heat medium flowing through the heat exchanging device bypass, the flow rate detecting device being disposed on the heat exchanging device bypass; and a heat controlling device, which is programmed to control that controls the heating device based on the flow rate of the heat medium detected by the flow rate detecting device.

4. The fuel cell system in accordance with claim 1, wherein the heat controlling device controls start and stop of the heating device based on the flow rate of the heat medium detected by the flow rate detecting device.

5. The fuel cell system in accordance with claim 1, wherein the flow rate detecting device detects a flow rate of the heat medium flowing through the heat exchanging device bypass according to a difference in pressure between the heat medium flowing into the heating device and the heat medium flowing out of the heating device.

6. The fuel cell system in accordance with claim 1, wherein the heat controlling device controls the heating device such that, if the flow rate of the heat medium detected by the flow rate detecting device is smaller than a predetermined flow rate, the heating device does not apply heating process to the heat medium.

7. The fuel cell system in accordance with claim 1, wherein the heat medium flow rate controlling device is a three-way valve, the three-way valve allowing the heat medium to flow through one of the heat medium circulating paths and the heat exchanging device bypass, based on the temperature of the fuel cell detected by the temperature detecting device.

8. The fuel cell system in accordance with claim 1, wherein the heat medium pump is a pump that is capable of adjusting the flow rate of the heat medium flowing through the heat medium circulating path, the pump adjusting the flow rate based on the temperature of the fuel cell detected by the temperature detecting device.

9. The fuel cell system in accordance with claim 1, wherein the heat exchanging device is a radiator, the radiator cooling down the heat medium flowing therethrough by causing the heat medium to exchange heat with outside air.

10. The fuel cell system in accordance with claim 1, wherein the heating device is an electric heater or a combustion-type heater.

11. The fuel cell system in accordance with claim 3, wherein the heat controlling device controls start and stop of the heating device based on the flow rate of the heat medium detected by the flow rate detecting device.

12. The fuel cell system in accordance with claim 3, wherein the flow rate detecting device detects a flow rate of the heat medium flowing through the heat exchanging device bypass according to a difference in pressure between the heat medium flowing into the heating device and the heat medium flowing out of the heating device.

13. The fuel cell system in accordance with claim 3, wherein the heat controlling device controls the heating device such that, if the flow rate of the heat medium detected by the flow rate detecting device is smaller than a predetermined flow rate, the heating device does not apply heating process to the heat medium.

14. The fuel cell system in accordance with claim 2, wherein the heat medium flow rate controlling device is a three-way valve, the three-way valve allowing the heat medium to flow through one of the heat medium circulating paths and the heat exchanging device bypass, based on the temperature of the fuel cell detected by the temperature detecting device.

15. The fuel cell system in accordance with claim 2, wherein the heat medium pump is a pump that is capable of adjusting the flow rate of the heat medium flowing through the heat medium circulating path, the pump adjusting the flow rate based on the temperature of the fuel cell detected by the temperature detecting device.

16. The fuel cell system in accordance with claim 3, wherein the heat exchanging device is a radiator, the radiator cooling down the heat medium flowing therethrough by causing the heat medium to exchange heat with outside air.

17. The fuel cell system in accordance with claim 3, wherein the heating device is an electric heater or a combustion-type heater.

18. The fuel cell system in accordance with claim 1, wherein the heat controlling device is programmed to control the heating device to be activated if the flow rate of the heat medium detected by the flow rate detecting device is greater or equal to a preset threshold.

19. The fuel cell system in accordance with claim 3, wherein the heat controlling device is programmed to control the heating device to be activated if the flow rate of the heat medium detected by the flow rate detecting device is greater or equal to a preset threshold.

* * * * *

UNITED STATES PATENT AND TRADEMARK OFFICE
CERTIFICATE OF CORRECTION

| | | |
|---|---|---|
| PATENT NO. | : 8,735,011 B2 | Page 1 of 1 |
| APPLICATION NO. | : 11/920859 | |
| DATED | : May 27, 2014 | |
| INVENTOR(S) | : Mitsuru Kimata | |

It is certified that error appears in the above-identified patent and that said Letters Patent is hereby corrected as shown below:

In the Claims

Column 11, line 9, Claim 3, change "that controls the heating" to --the heating--.

Signed and Sealed this
Seventeenth Day of February, 2015

Michelle K. Lee
*Deputy Director of the United States Patent and Trademark Office*